US011595067B2

(12) United States Patent
Huang

(10) Patent No.: US 11,595,067 B2
(45) Date of Patent: Feb. 28, 2023

(54) WIRELESS TRANSMITTERS HAVING SELF-INTERFERENCE CANCELLATION CIRCUITRY

(71) Applicant: Apple Inc., Cupertino, CA (US)

(72) Inventor: Yen-Ling Huang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/475,915

(22) Filed: Sep. 15, 2021

(65) Prior Publication Data

US 2022/0052718 A1 Feb. 17, 2022

Related U.S. Application Data

(63) Continuation of application No. 16/994,423, filed on Aug. 14, 2020, now Pat. No. 11,245,430.

(51) Int. Cl.
*H04B 1/04* (2006.01)

(52) U.S. Cl.
CPC .................. *H04B 1/0475* (2013.01)

(58) Field of Classification Search
CPC .... H04B 1/0475; H04B 1/525; H04B 1/0007; H04B 7/15585; H04B 1/04
(Continued)

(56) References Cited

U.S. PATENT DOCUMENTS 8,954,024 B2  2/2015  Tung
9,634,823 B1  4/2017  Hahn et al.
(Continued)

FOREIGN PATENT DOCUMENTS

CN  101563851 A  10/2009
CN  104521148 A  4/2015
(Continued)

OTHER PUBLICATIONS

Van Liempd et al., RF Self-Interference Cancellation for Full-Duplex, 2014 9th International Conference on Cognitive Radio Oriented Wireless Networks and Communications (CROWNCOM), IEEE, 2014.
(Continued)

*Primary Examiner* — Emmanuel Bayard
(74) *Attorney, Agent, or Firm* — Treyz Law Group, P.C.; Michael H. Lyons

(57) ABSTRACT

An electronic device may include wireless circuitry with a baseband processor, a digital transmitter, a digital-to-analog-converter (DAC), and an antenna. The baseband processor may produce baseband signals. The digital transmitter may generate self-interference-compensated signals based on the baseband signals. The DAC may generate radio-frequency signals for transmission by the antenna based on the self-interference-compensated signals and square-wave local oscillator waveforms. The digital transmitter may include a self-interference canceller that generates the self-interference-compensated signals. The self-interference-compensated signals may mitigate the creation of self-interferer repetition replicas that land on the carrier frequency of the radio-frequency signals. This may allow the radio-frequency signals to be free from error vector magnitude degradation and spectral regrowth that would otherwise be produced due to self-interference in the radio-frequency signals output by the DAC.

18 Claims, 7 Drawing Sheets

(58) Field of Classification Search
USPC .................................................. 375/295–297
See application file for complete search history.

(56) References Cited

U.S. PATENT DOCUMENTS

| | | | |
|---|---|---|---|
| 9,973,360 B2 | 5/2018 | Doare et al. | |
| 10,244,409 B2 | 3/2019 | Ridel et al. | |
| 10,284,356 B2* | 5/2019 | Bharadia | H04B 1/525 |
| 10,511,477 B2 | 12/2019 | Luo et al. | |
| 2002/0193085 A1 | 12/2002 | Mathe et al. | |
| 2009/0251368 A1 | 10/2009 | McCune, Jr. | |
| 2011/0075780 A1 | 3/2011 | Petrovic | |
| 2013/0114468 A1 | 5/2013 | Hui et al. | |
| 2013/0301488 A1* | 11/2013 | Hong | H04B 1/56 |
| | | | 370/278 |
| 2015/0311929 A1* | 10/2015 | Carbone | H04B 15/00 |
| | | | 455/78 |
| 2015/0318976 A1 | 11/2015 | Eltawil et al. | |
| 2017/0104506 A1* | 4/2017 | Liu | H04B 1/109 |
| 2017/0111155 A1 | 4/2017 | Liu et al. | |
| 2017/0170999 A1 | 6/2017 | Zhou et al. | |
| 2017/0353212 A1 | 12/2017 | Bharadia et al. | |
| 2018/0006795 A1 | 1/2018 | Raaf | |
| 2018/0139031 A1* | 5/2018 | Wu | H04B 1/1081 |
| 2018/0309601 A1 | 10/2018 | Kim et al. | |
| 2019/0158193 A1* | 5/2019 | Jain | H04L 5/14 |
| 2019/0245566 A1* | 8/2019 | Luo | H04B 1/525 |
| 2019/0327070 A1 | 10/2019 | Jung et al. | |
| 2020/0266842 A1 | 8/2020 | Patel et al. | |
| 2020/0313716 A1 | 10/2020 | Bhat et al. | |
| 2020/0343934 A1* | 10/2020 | Weissman | H04B 1/0032 |
| 2021/0135770 A1 | 5/2021 | Schober et al. | |

FOREIGN PATENT DOCUMENTS

| | | | |
|---|---|---|---|
| CN | 108028673 A | 5/2018 | |
| CN | 109644013 A | 4/2019 | |
| EP | 3273606 A1 * | 1/2018 | H04B 1/44 |
| WO | 2016073940 A1 | 5/2016 | |

OTHER PUBLICATIONS

Syrjala et al., Analysis of Oscillator Phase-Noise Effects on Self-Interference Cancellation in Full-Duplex OFDM Radio Transceivers, IEEE Transactions on Wireless Communications 13.6 (2014): 2977-2990.

Ahmed, Self-interference Cancellation for Full-duplex MIMO Transceivers, Diss. Newcastle University, 2017, Newcastle upon Tyne, UK.

* cited by examiner

US 11,595,067 B2

WIRELESS TRANSMITTERS HAVING SELF-INTERFERENCE CANCELLATION CIRCUITRY

This application is a continuation of U.S. patent application Ser. No. 16/994,423, filed Aug. 14, 2020, which is hereby incorporated by reference herein in its entirety.

FIELD

This relates generally to electronic devices and, more particularly, to electronic devices with wireless communications circuitry.

BACKGROUND

Electronic devices are often provided with wireless communications capabilities. An electronic device with wireless communications capabilities has wireless communications circuitry with one or more antennas. Wireless transmitter circuitry in the wireless communications circuitry uses the antennas to transmit radio-frequency signals.

It can be challenging to form satisfactory wireless transmitter circuitry for an electronic device. If care is not taken in the wireless transmitter circuitry design, self-interference in the wireless transmitter circuitry can undesirably degrade the radio-frequency signals transmitted by the antennas.

SUMMARY

An electronic device may include wireless circuitry for performing wireless communications. The wireless circuitry may include a baseband processor, a digital transmitter, a digital-to-analog-converter (DAC), and an antenna. The baseband processor may produce baseband signals. The digital transmitter may generate self-interference-compensated signals based on the baseband signals. A local oscillator (LO) generator in the wireless circuitry may generate square-wave LO waveforms with M-phases. The DAC may generate radio-frequency signals for transmission by the antenna based on the self-interference-compensated signals and the square-wave LO waveforms.

The digital transmitter may include a self-interference canceller for mitigating self-interference in the radio-frequency signals. The self-interference canceller may include conversion circuitry coupled to an input path of the self-interference canceller. The conversion circuitry may convert a signal of interest from the baseband signals into multiphase basis vectors or a polar amplitude and phase. The self-interference canceller may include self-interference term generators, finite impulse response (FIR) filters, and multipliers coupled in parallel between the conversion circuitry and an output path of the self-interference canceller. First and second adders may be coupled between the multipliers and the output path. Delay circuitry may be interposed on a bypass path coupled between the input path and the output path. The delay circuitry may generate a time-delayed version of the signal of interest.

The self-interference term generators may generate self-interference terms of the signal of interest based on the basis vectors or the polar amplitude and phase. The FIR filters may generate filtered terms based on the self-interference terms. The FIR filters may, for example, implement a sinc function of a zero order hold operation. The multipliers may multiply the filtered terms by complex coefficient values to generate scaled terms. The first adder may sum the scaled terms to generate self-interference-cancelling terms. The second adder may add the self-interference-cancelling terms to the time-delayed version of the signal of interest to produce the self-interference-compensated signals on the output path. The self-interference canceller may be located in a relatively high sample rate portion or a relatively low sample rate portion of the digital transmitter. The self-interference-compensated signals may mitigate the creation of self-interferer repetition replicas that land on the carrier frequency of the radio-frequency signals.

This may allow the radio-frequency signals to be free from error vector magnitude (EVM) degradation and/or spectral regrowth that would otherwise be produced due to self-interference in the digital transmitter circuitry (e.g., without using bulky or expensive analog components).

An aspect of the disclosure provides an electronic device. The electronic device can have a baseband processor. The baseband processor can generate baseband signals. The electronic device can have a digital transmitter coupled to the baseband processor. The digital transmitter can receive the baseband signals. The electronic device can have a self-interference canceller in the digital transmitter. The self-interference transmitter can generate self-interference-compensated signals based on the baseband signals. The electronic device can have a digital-to-analog converter (DAC) coupled to the digital transmitter. The DAC can have a signal input. The signal input can receive the self-interference-compensated signals. The DAC can generate radio-frequency signals based on the self-interference-compensated signals. The electronic device can have an antenna coupled to an output of the DAC. The antenna can transmit the radio-frequency signals.

An aspect of the disclosure provides a method for operating a self-interference canceller on a digital transmitter to produce a self-interference-compensated signal. The self-interference-compensated signal can correspond to a radio-frequency signal for transmission by an antenna. The method can include, with a multiphase decoder in the self-interference canceller, converting a signal of interest from an in-phase quadrature-phase (I/Q) format into signal terms of a different format. The method can include, with self-interference term generators coupled in parallel to the multiphase decoder, generating self-interference terms of the signal of interest based on the signal terms of the different format. The method can include, with FIR filters coupled to the self-interference term generators, filtering the self-interference terms to generate filtered terms. The method can include, with multipliers coupled to the FIR filters, multiplying the filtered terms by complex coefficient values to generate scaled terms. The method can include, with a first adder coupled to the multipliers, summing the scaled terms to generate self-interference cancelling terms. The method can include, with delay circuitry in the self-interference canceller, generating a time-delayed version of the signal of interest. The method can include, with a second adder coupled to the first adder and the delay circuitry, generating the self-interference-compensated signal by adding the self-interference cancelling terms to the time-delayed version of the signal of interest.

An aspect of the disclosure provides a non-transitory computer-readable storage medium. The non-transitory computer-readable storage medium can store one or more programs that can be executed by at least one processor on an electronic device. The one or more programs can include instructions that, when executed by the at least one processor, cause the at least one processor to convert a signal of interest from an in-phase quadrature-phase (I/Q) format into signal terms of a different format. The one or more programs can include instructions that, when executed by the at least one processor, cause the at least one processor to generate self-interference terms of the signal of interest based on the signal terms of the different format. The one or more programs can include instructions that, when executed by the at least one processor, cause the at least one processor to filter the self-interference terms to generate filtered terms. The one or more programs can include instructions that, when executed by the at least one processor, cause the at least one processor to multiply the filtered terms by complex coefficient values to generate scaled terms. The one or more programs can include instructions that, when executed by the at least one processor, cause the at least one processor to sum the scaled terms to generate self-interference cancelling terms. The one or more programs can include instructions that, when executed by the at least one processor, cause the at least one processor to generate a time-delayed version of the signal of interest. The one or more programs can include instructions that, when executed by the at least one processor, cause the at least one processor to generate a self-interference-compensated signal by adding the self-interference cancelling terms to the time-delayed version of the signal of interest.

DETAILED DESCRIPTION

Figure 1:
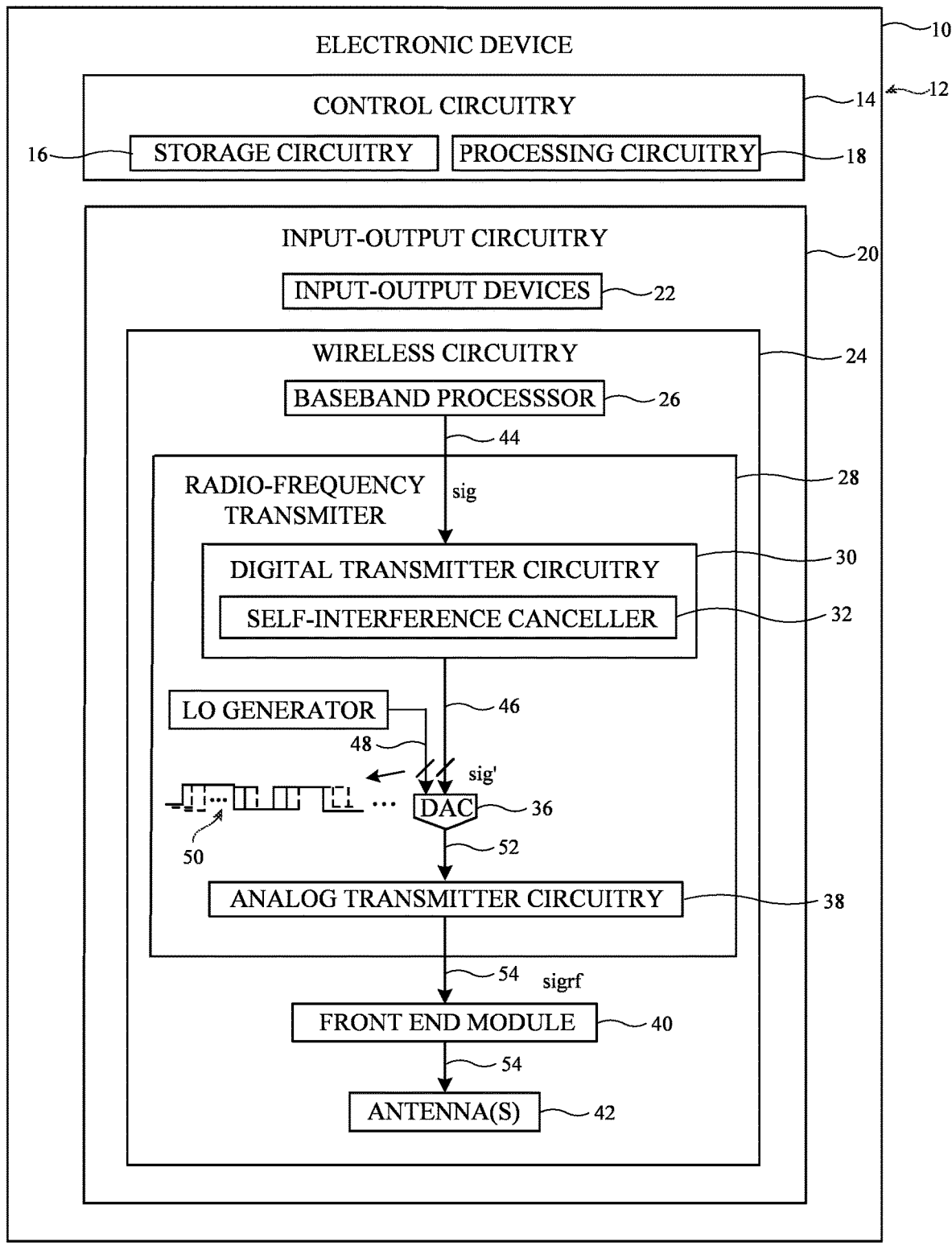
FIG. 1 is a schematic diagram of an illustrative electronic device having a wireless transmitter with a self-interference canceller in accordance with some embodiments.

An electronic device such as electronic device 10 of FIG. 1 may be provided with wireless circuitry. The wireless circuitry may include a digital transmitter that transmits radio-frequency signals at a carrier frequency using one or more antennas. The digital transmitter may include a local oscillator and a self-interference canceller. The self-interference canceller may produce self-interference-compensated signals that are transmitted at the carrier frequency using the antennas. The self-interference-compensated signals may be free from self-interference associated with harmonics of the local oscillator.

Electronic device 10 of FIG. 1 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in the schematic diagram FIG. 1, device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more microprocessors, microcontrollers, digital signal processors, host processors, baseband processor integrated circuits, application specific integrated circuits, central processing units (CPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 5G protocols, etc.), antenna diversity protocols, satellite navigation system protocols (e.g., global positioning system (GPS) protocols, global navigation satellite system (GLONASS) protocols, etc.), antenna-based spatial ranging protocols (e.g., radio detection and ranging (RADAR) protocols or other desired range detection protocols for signals conveyed at millimeter and centimeter wave frequencies), or any other desired communications protocols. Each communications protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, and other input-output components. For example, input-output devices 22 may include touch sensors, displays, light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), etc. In some configurations, keyboards, headphones, displays, pointing devices such as trackpads, mice, and joysticks, and other input-output devices may be coupled to device 10 using wired or wireless connections (e.g., some of input-output devices 22 may be peripherals that are coupled to a main processing unit or other portion of device 10 via a wired or wireless link).

Input-output circuitry 20 may include wireless circuitry 24 to support wireless communications. Wireless circuitry 24 (sometimes referred to herein as wireless communications circuitry 24) may include a baseband processor such as baseband processor 26, radio-frequency (RF) transmitter circuitry such as radio-frequency transmitter 28, radio-frequency front end circuitry such as front end module 40, and one or more antennas 42. Baseband processor 26 may be coupled to radio-frequency transmitter 28 over baseband path 44. Radio-frequency transmitter 28 may be coupled to antenna(s) 42 over radio-frequency transmission line path 54. Front end module 40 may be interposed on radio-frequency transmission line path 54.

In the example of FIG. 1, wireless circuitry 24 is illustrated as including only a single baseband processor 26, a single radio-frequency transmitter 28, and a single front end module 40 for the sake of clarity. In general, wireless circuitry 24 may include any desired number of baseband processors 26, any desired number of radio-frequency transmitters 28, any desired number of front end modules 40, and any desired number of antennas 42. Each antenna may be coupled to radio-frequency transmitter 28 over a respective radio-frequency transmission line path, for example. Radio-frequency transmitter 28 may transmit radio-frequency signals using antenna(s) 42. If desired, wireless circuitry 24 may also include one or more radio-frequency receivers for receiving radio-frequency signals using antenna(s) 42 (e.g., the radio-frequency receiver and radio-frequency transmitter 28 may collectively form a radio-frequency transceiver for wireless circuitry 24).

Radio-frequency transmission line path 54 may be coupled to an antenna feed on antenna(s) 42. The antenna feed may, for example, include a positive antenna feed terminal and a ground antenna feed terminal. Radio-frequency transmission line path 54 may have a positive transmission line signal path such that is coupled to the positive antenna feed terminal on antenna(s) 42. Radio-frequency transmission line path 54 may have a ground transmission line signal path that is coupled to the ground antenna feed terminal on antenna(s) 42. This example is merely illustrative and, in general, antenna(s) 42 may be fed using any desired antenna feeding scheme. If desired, each antenna 42 may have multiple antenna feeds that are coupled to one or more radio-frequency transmission line paths 54.

Radio-frequency transmission line path 54 may include transmission lines that are used to route radio-frequency antenna signals within device 10. Transmission lines in device 10 may include coaxial cables, microstrip transmission lines, stripline transmission lines, edge-coupled microstrip transmission lines, edge-coupled stripline transmission lines, transmission lines formed from combinations of transmission lines of these types, etc. Transmission lines in device 10 such as transmission lines in radio-frequency transmission line path 54 may be integrated into rigid and/or flexible printed circuit boards. In one suitable arrangement, radio-frequency transmission line paths such as radio-frequency transmission line path 54 may also include transmission line conductors integrated within multilayer laminated structures (e.g., layers of a conductive material such as copper and a dielectric material such as a resin that are laminated together without intervening adhesive). The multilayer laminated structures may, if desired, be folded or bent in multiple dimensions (e.g., two or three dimensions) and may maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

In an example that is described herein as an example, radio-frequency transmitter 28 may include digital transmitter circuitry such as digital transmitter circuitry 30 (sometimes referred to herein as digital transmitter 30). In performing wireless transmission, baseband processor 26 may provide baseband signals sig to digital transmitter circuitry 30 over baseband path 44. Digital transmitter circuitry 30 may include circuitry for operating on baseband signals sig in the digital domain.

The output of digital transmitter circuitry 30 may be coupled to the input(s) of digital-to-analog converter (DAC) 36 (e.g., via local oscillator (LO) path 48 and signal path 46). The output of DAC 36 (sometimes referred to herein as DAC circuitry 36) may be coupled to the input of analog transmitter circuitry 38 via output path 52. DAC 36 may convert the signals output by digital transmitter circuitry 30 into corresponding analog signals and may provide the analog signals to analog transmitter circuitry 38. Analog transmitter circuitry 38 may include circuitry for operating on these signals in the analog domain. The output of analog transmitter circuitry 38 may be coupled to the input of front end module 40 via a portion of radio-frequency transmission line path 54. This example is merely illustrative and, if desired, analog transmitter circuitry 38 may be omitted (e.g., the output path 52 from DAC 36 may be coupled to radio-frequency transmission line path 54). Radio-frequency transmitter 28 may output radio-frequency signals sigrf (e.g., radio-frequency signals corresponding to the baseband signals sig output by baseband processor 26) onto radio-frequency transmission line path 54 (e.g., via one or more output ports of radio-frequency transmitter 28).

Radio-frequency signals sigrf may be produced by radio-frequency transmitter 28 at a carrier frequency. The carrier frequency may lie within a corresponding frequency band (sometimes referred to herein as a communications band or simply as a "band"). The frequency bands handled by radio-frequency transmitter 28 may include wireless local area network (WLAN) frequency bands (e.g., Wi-Fi® (IEEE 802.11) or other WLAN communications bands) such as a 2.4 GHz WLAN band (e.g., from 2400 to 2480 MHz) or a 5 GHz WLAN band (e.g., from 5180 to 5825 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), near-field communications frequency bands (e.g., at 13.56 MHz), satellite navigation frequency bands (e.g., a GPS band from 1565 to 1610 MHz), ultra-wideband (UWB) frequency bands that operate under the IEEE 802.15.4 protocol and/or other ultra-wideband communications protocols, and/or any other desired frequency bands of interest.

Front end module (FEM) 40 may include radio-frequency front end circuitry that operates on the radio-frequency signals sigrf transmitted over radio-frequency transmission line path 54. FEM 40 may, for example, include FEM components such as switching circuitry (e.g., one or more radio-frequency switches), radio-frequency filter circuitry (e.g., low pass filters, high pass filters, notch filters, band pass filters, multiplexing circuitry, duplexer circuitry, diplexer circuitry, triplexer circuitry, etc.), impedance matching circuitry (e.g., circuitry that helps to match the impedance of antenna(s) 42 to the impedance of radio-frequency transmission line path 54), antenna tuning circuitry (e.g., networks of capacitors, resistors, inductors, and/or switches that adjust the frequency response of antenna(s) 42), radio-frequency amplifier circuitry (e.g., power amplifier circuitry and/or low-noise amplifier circuitry), radio-frequency coupler circuitry, charge pump circuitry, power management circuitry, digital control and interface circuitry, and/or any other desired circuitry that operates on the radio-frequency signals transmitted by radio-frequency transmitter 28. Each of the FEM components may be mounted to a common (shared) substrate such as a rigid printed circuit board substrate or flexible printed circuit substrate. Radio-frequency transmitter 28 may be separate from FEM 40. For example, radio-frequency transmitter 28 may be formed on another substrate such as the main logic board of device 10, a rigid printed circuit board, or flexible printed circuit that is not a part of FEM 40.

While control circuitry 14 is shown separately from wireless circuitry 24 in the example of FIG. 1 for the sake of clarity, wireless circuitry 24 may include processing circuitry that forms a part of processing circuitry 18 and/or storage circuitry that forms a part of storage circuitry 16 of control circuitry 14 (e.g., portions of control circuitry 14 may be implemented on wireless circuitry 24). As an example, baseband processor 26, portions of FEM 40, and/or portions of radio-frequency transmitter 28 may form a part of control circuitry 14.

The output of FEM 40 may be coupled to antenna(s) 42 over a portion of radio-frequency transmission line path 54. Antenna(s) 42 may be formed using any desired antenna structures. For example, antenna(s) 42 may include an antenna with a resonating element that is formed from loop antenna structures, patch antenna structures, inverted-F antenna structures, slot antenna structures, planar inverted-F antenna structures, helical antenna structures, monopole antennas, dipoles, hybrids of these designs, etc. Filter circuitry, switching circuitry, impedance matching circuitry, and other circuitry may be interposed within radio-frequency transmission line path 54, may be incorporated into FEM 40, and/or may be incorporated into antenna(s) 42 (e.g., to support antenna tuning, to support operation in desired frequency bands, etc.). These components, sometimes referred to herein as antenna tuning components, may be adjusted (e.g., using control circuitry 14) to adjust the frequency response and wireless performance of antenna(s) 42 over time.

In radio-frequency transmitters, radio-frequency signals may be constructed using square-wave local oscillator (LO) waveforms. For example, as shown in FIG. 1, radio-frequency transmitter 28 may include an LO generator such as LO generator 34. LO generator 34 (sometimes referred to herein as LO generator circuitry 34) may produce LO waveforms such as square-wave LO waveforms 50 (e.g., waveforms having M phases in an example where digital transmitter circuitry 30 is implemented using a multiphase architecture). LO generator 34 may output square-wave LO waveforms 50 on LO path 48. Digital transmitter circuitry 30 may produce digital signals sig' based on the baseband signals sig received from baseband processor 26. Digital signals sig' may be a digital version of the signals to be transmitted over antenna(s) 42. Digital transmitter circuitry 30 may output digital signals sig' over signal path 46.

DAC 36 may have a first set of inputs (e.g., a set of LO inputs sometimes referred to collectively herein as the LO input of DAC 36) that receive square-wave LO waveforms 50 from LO generator 34 over LO path 48. DAC 36 may also have a second set of inputs (e.g., a set of signal inputs sometimes collectively referred to herein as the signal input of DAC 36) that receive digital signals sig' over signal path 46. DAC 36 may convert digital signals sig' to the analog domain and may construct the corresponding radio-frequency signals (e.g., radio-frequency signals sigrf) using square-wave LO waveforms 50. DAC 36 may output these radio-frequency signals on output path 52.

Digital transmitter circuitry 30 may be implemented using a multiphase architecture or a polar architecture, as examples. In the multiphase architecture, each sample point of digital signals sig' is represented by a first basis vector $\overrightarrow{BV_1}=(n_1,\theta_1)$ and by a second basis vector $\overrightarrow{BV_2}=(n_2,\theta_2)$, where $n_1$ is the magnitude of the first basis vector, $\theta_1$ is the phase of the first basis vector, $n_2$ is the magnitude of the second basis vector, and $\theta_2$ is the phase of the second basis vector. The phase difference between the first and second basis vectors may be equal to $\pm 360°/M$, where M is the number of phases used. As an example, if digital transmitter circuitry 30 uses four phases (M=4), the phase difference is ±90°. Similarly, if digital transmitter circuitry 30 uses eight phases (M=8), the phase difference is ±45°. In general, any desired number of phases may be used. In the polar architecture, each sample point of digital signals sig' is represented by a corresponding (polar) amplitude A and (polar) phase θ in the complex plane.

To generate a phase rotation on a square-wave LO waveform, the waveform itself is delayed by a certain time τ=θ/ω, where ω is the angular frequency of the waveform. While the square-wave LO waveform is produced by LO generator 34 at a fundamental frequency, the waveform also contains higher order harmonics of the fundamental frequency (sometimes referred to herein as LO harmonics). The phase rotation will therefore be even higher at each of the LO harmonics, creating bandwidth-expanded self-interferers at the LO harmonics.

In the example where digital-transmitter circuitry 30 uses a multiphase architecture, the radio-frequency signal as a function of time ($RF_{out}(t)$) constructed by DAC 36 using square-wave LO waveforms 50 at radio-frequencies (e.g., radio-frequency signals sigrf) are described mathematically by equation 1.

$$RF_{out}(t) = n_1(t) \times LO(t+\tau_1(t)) + n_2(t) \times LO(t+\tau_2(t)) \quad (1)$$

In equation 1, $LO(t+\tau_1(t))$ describes a square-wave LO waveform as a function of time with a phase shift selected from the square-wave LO waveforms 50 by the phase of first basis vector $\overrightarrow{BV_1}$ and $LO(t+\tau_2(t))$ describes a square-wave LO waveform as a function of time with a phase shift selected from the square-wave waveforms 50 by the phase of second basis vector $\overrightarrow{BV_2}$.

Terms $LO(t+\tau_1(t))$ and $LO(t+\tau_2(t))$ can be expanded as sums of cosines and equation 1 can be rewritten as equation 2.

$$RF_{out}(t) = n_1(t) \times \frac{4}{\pi}\left[\cos(\omega t + \theta_1(t)) - \frac{1}{3}\cos(3\omega t + 3\theta_1(t)) + \frac{1}{5}\cos(5\omega t + 5\theta_1(t)) + K1\right] + n_2(t) \times \frac{4}{\pi}\left[\cos(\omega t + \theta_2(t)) - \frac{1}{3}\cos(3\omega t + 3\theta_2(t)) + \frac{1}{5}\cos(5\omega t + 5\theta_2(t)) + K2\right] \quad (2)$$

In equation 2, K1 includes the higher order terms from the expansion of $LO(t+\tau_1(t))$ and K2 includes the higher order terms from the expansion of $LO(t+\tau_2(t))$.

Equation 2 can be rewritten in complex form as equation 3.

$$RF_{out}(t) = \frac{4}{\pi}\Re\{[n_1(t)\exp(j\theta_1(t)) + n_2(t)\exp(j\theta_2(t))] \times \exp(j\omega t)\} - \frac{1}{3} \times \frac{4}{\pi}\Re\{[n_1(t)\exp(j3\theta_1(t)) + n_2(t)\exp(j3\theta_2(t))] \times \exp(j3\omega t)\} + \frac{1}{5} \times \frac{4}{\pi}\Re\{[n_1(t)\exp(j5\theta_1(t)) + n_2(t)\exp(j5\theta_2(t))] \times \exp(j5\omega t)\} + K3 \quad (3)$$

In equation 3, the operator $\Re\{\}$ gives the real component of its argument, $j=\sqrt{-1}$, and K3 includes the higher order terms of the expansion in complex form. From equation 3, the fundamental term argument $[n_1(t) \exp(j\theta_1(t)) + n_2(t) \exp(j\theta_2(t))] \times \exp(j\omega t)$ represents the signal of interest (SOI) at the fundamental frequency of the square-wave LO waveform, whereas the first and second harmonic term arguments $[n_1(t) \exp(j3\theta_1(t)) + n_2(t) \exp(j3\theta_2(t))] \times \exp(j3\omega t)$ and $[n_1(t) \exp(j5\theta_1(t)) + n_2(t) \exp(j5\theta_2(t))] \times \exp(j5\omega t)$ represent the generated self-interferers at the third and fifth LO harmonics. In general, there may also be self-interferers from the higher order terms K3.

The signal of interest itself is discrete at baseband and is then up-sampled to a carrier divided rate and transformed to a continuous signal through the zero order hold behavior of DAC 36. As digital transmitters lack a baseband signal reconstruction filter such as a low pass filter, the repetition replicas of the self-interferers at the LO harmonics (e.g., the repetition replicas of the first and second harmonic term arguments from equation 3, after conversion by DAC 36) may undesirably land on the carrier frequency of the radio-frequency signals output by radio-frequency transmitter 28 (e.g., the carrier frequency of radio-frequency signals sigrf). The repetition replicas may, for example, manifest as artifacts in the analog signals output by DAC 36, which may cause undesirable distortion of the radio-frequency signals (e.g., error vector magnitude (EVM) degradation and/or spectral regrowth) that limits the overall radio-frequency performance of wireless circuitry 24.

For example, under a multiphase architecture with four phases (M=4), the third, seventh, eleventh, and higher order LO harmonics may create self-interferers from the image of the signal of interest, where the repetition replicas of the self-interferers will land on the carrier frequency of the radio-frequency signals and will cause EVM degradation in the radio-frequency signals. As another example, under a multiphase architecture with eight phases (M=8), the third order LO harmonic may create a 3X bandwidth extended self-interferer that has a repetition replica landing on the carrier frequency to cause EVM degradation and spectral regrowth, the fifth order LO harmonic may create an image of a 3X bandwidth extended self-interferer that has a repetition replica landing on the carrier frequency to cause EVM degradation and spectral regrowth, the seventh order LO harmonic may create a self-interferer from the image of the signal of interest, where the repetition replica of the self-interferer lands on the carrier frequency to cause EVM degradation, etc.

In order to mitigate these self-interference effects in digital transmitter circuitry 30, digital transmitter circuitry 30 may include self-interference cancellation circuitry such as self-interference canceller 32. Self-interference canceller 32 (sometimes referred to herein as self-interference canceller circuitry 32, self-interference cancellation circuitry 32, or self-interference cancellation engine 32) may perform operations on baseband signals sig (or a version of baseband signals sig that has already been operated on by other components in digital transmitter circuitry 30) to produce the digital signals sig' that are provided to DAC 36 over signal path 46. Digital signals sig' may sometimes be referred to herein as self-interference-compensated signals sig'. The operations performed by self-interference canceller 32 in generating self-interference-compensated signals sig' may configure the signals to cancel out subsequent distortion caused by the repetition replicas landing on the carrier frequency of the radio-frequency signals sigrf output by DAC 36. This may allow radio-frequency signals sigrf to be free of the EVM degradation and spectral regrowth caused by the self-interference produced by DAC 36, thereby optimizing the wireless performance of wireless circuitry 24. This self-interference mitigation may be performed entirely within the digital domain (e.g., digital transmitter circuitry 30) without the need for additional bulky and expensive analog components to help mitigate self-interference in radio-frequency transmitter 28.

Figure 2:
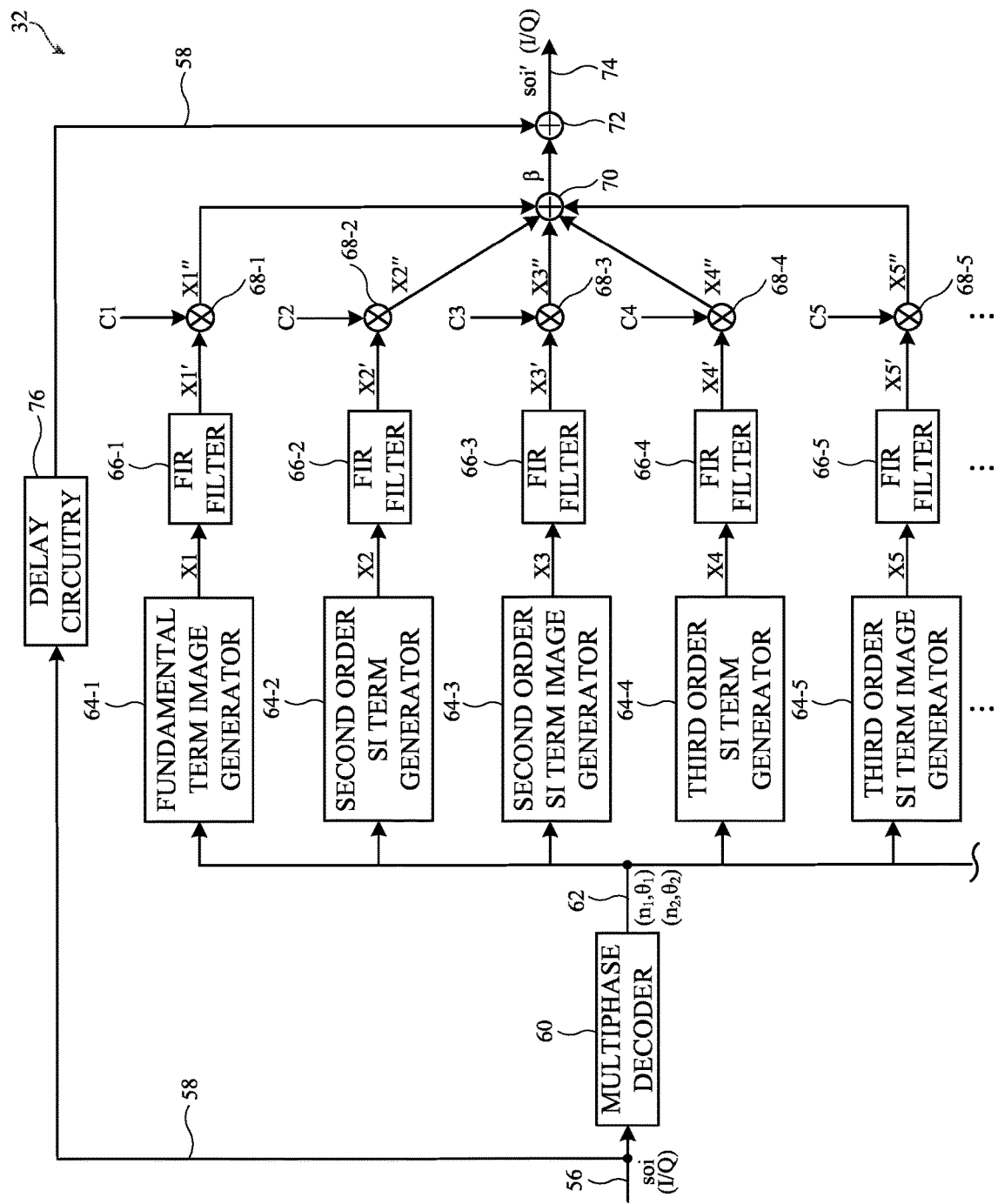
FIG. 2 is a circuit diagram of an illustrative multiphase self-interference canceller in accordance with some embodiments.

FIG. 2 is a circuit diagram of self-interference canceller 32 in an example where digital transmitter circuitry 30 is implemented using a multiphase architecture. In scenarios where self-interference canceller 32 is implemented using a multiphase architecture, self-interference canceller 32 may sometimes be referred to herein as multiphase self-interference canceller 32.

As shown in FIG. 2, self-interference canceller 32 may have an input path 56 and an output path 74. Input path 56 may be coupled to baseband path 44 (FIG. 1) through zero, one, or more than one other component in digital transmitter circuitry 30. Output path 74 may be coupled to signal path 46 and thus the set of signal inputs of DAC 36 through zero, one, or more than one other component in digital transmitter circuitry 30.

Input path 56 may receive a signal of interest soi over input path 56. Signal of interest soi may, for example, be the signal of interest of the baseband signals sig received by digital transmitter circuitry 30 over baseband path 44 (FIG. 1) for transmission via antenna(s) 42. Signal of interest soi may, for example, contain wireless data to be transmitted to external communications equipment using antenna(s) 42. Signal of interest soi may be received by self-interference canceller 32 in an in-phase and quadrature-phase (I/Q) format (e.g., input path 56 may include a first line that conveys the in-phase (I) component of signal of interest soi and a second line that conveys the quadrature-phase (Q) component of signal of interest soi).

Self-interference canceller 32 may generate self-interference-compensated signal soi' based on signal of interest soi. Self-interference-compensated signal soi' may be a version of signal of interest soi that has been compensated, by self-interference canceller 32, for subsequent self-interference due to repetition replicas landing on the carrier frequency of radio-frequency signals sigrf (FIG. 1). Self-interference-compensated signal soi' may, for example, form self-interference-compensated signal sig' of FIG. 1 (e.g., after passing through any remaining components in the transmit chain of digital transmitter circuitry 30 prior to being provided to the set of signal inputs of DAC 36). Self-interference canceller 32 may output self-interference-compensated signal soi' onto output path 74. Self-interference-compensated signal soi' may be in I/Q format (e.g., output path 74 may include a first line that conveys the in-phase (I) component of self-interference-compensated signal soi' and a second line that conveys the quadrature-phase (Q) component of self-interference-compensated signal soi'). Signal of interest soi and self-interference-compensated signal soi' may, for example, be at a baseband frequency (e.g., signal of interest soi and self-interference-compensated signal soi' may be baseband signals that are later up-converted to radio-frequencies).

As shown in FIG. 2, self-interference canceller 32 may include a multiphase decoder such as multiphase decoder 60, self-interference term generators 64 (e.g., a first self-interference term generator 64-1, a second self-interference term generator 64-2, a third self-interference term generator 64-3, etc.), filters such as finite impulse response (FIR) filters 66 (e.g., a first FIR filter 66-1, a second FIR filter 66-2, a third FIR filter 66-3, etc.), multipliers such as multipliers 68 (e.g., a first multiplier 68-1, a second multiplier 68-2, a third multiplier 68-3, etc.), adders such as adder 70 and adder 72, and delay circuitry such as delay circuitry 76. These components of self-interference canceller 32 may be formed from digital logic (e.g., digital logic gates) in digital transmitter circuitry 30 (FIG. 1).

The input of multiphase decoder 60 may be coupled to input path 56. The output of multiphase decoder 60 may be coupled to the inputs of self-interference term generators 64 over path 62 (e.g., self-interference term generators 64 may be coupled to input path 56 via multiphase decoder 60 in parallel). The output of each self-interference term generator 64 may be coupled to the input of a respective FIR filter 66 (e.g., self-interference term generators 64 may be coupled or interposed between multiphase decoder 60 and FIR filters 66 in self-interference canceller 32). The output of each FIR filter 66 may be coupled to the input of a respective multiplier 68 (e.g., FIR filters 66 may be coupled or interposed in series between self-interference term generators 64 and multipliers 68 in self-interference canceller 32). The output of each multiplier 68 may be coupled to the input of adder 70 (e.g., multipliers 68 may be coupled or interposed between FIR filters 66 and adder 70 in self-interference canceller 32). In other words, self-interference term generators 64, FIR filters 66, and multipliers 68 may be coupled in parallel between input path 56 and adder 70. The output of adder 70 may be coupled to a first input of adder 72 (e.g., adder 70 may be coupled or interposed between multipliers 68 and adder 72 in self-interference canceller 32). Self-interference canceller 32 may have a bypass path such as bypass path 58 that is coupled between input path 56 and a second input of adder 72. Delay circuitry 76 may be interposed on bypass path 58. The output of adder 72 may be coupled to output path 74.

Multiphase decoder 60 (sometimes referred to herein as multiphase decoder circuitry 60, I/Q-to-multiphase decoder 60, or I/Q-to-multiphase decoder circuitry 60) may receive signal of interest soi in I/Q format over input path 56. Multiphase decoder 60 may decode signal of interest soi to convert the signal of interest from the I/Q format to a multiphase format. In the multiphase format, each sample point of signal of interest soi is represented by first basis vector $\overrightarrow{BV_1} = (n_1, \theta_1)$ and second basis vector $\overrightarrow{BV_2} = (n_2, \theta_2)$. For each sample point of signal of interest soi, multiphase decoder 60 may provide first basis vector $\overrightarrow{BV_1}$ and second basis vector $\overrightarrow{BV_2}$ to each of the self-interference term generators 64 over path 62. For the sake of simplicity, the operations of self-interference canceller 32 are described below in reference to operations performed for a single sample point of signal of interest soi. However, the operations may be performed over time on each sample point of signal of interest soi in producing the time-varying self-interference-compensated signal soi'.

Each self-interference term generator 64 (sometimes each referred to herein as self-interference term generator circuits 64 or collectively as self-interference term generation circuitry 64) may individually (independently) generate a respective self-interference term X based on first basis vector $\overrightarrow{BV_1}$ and second basis vector $\overrightarrow{BV_2}$ (e.g., self-interference term generator 64-1 may generate self-interference term X1, self-interference term generator 64-2 may generate self-interference term X2, self-interference term generator 64-3 may generate self-interference term X3, etc.). Self-interference terms X may be provided to FIR filters 66. Self-interference term generators 64 may generate each of the self-interference terms X in parallel.

Self-interference term generator 64-1 may generate self-interference term X1 as the image of the fundamental term of signal of interest soi. Self-interference term generator 64-1 may therefore sometimes be referred to herein as fundamental term image generator 64-1 or fundamental term image generator circuit 64-1. Self-interference term generator 64-1 may, for example, generate self-interference term X1 (the image of the fundamental term of signal of interest soi) using the equation $X1=n_1 \exp(-\theta_1)+n_2 \exp(-\theta_2)$, where $n_1$ and $\theta_1$ are given by the first basis vector $\vec{BV_1}$ and where $n_2$ and $\theta_2$ are given by the second basis vector $\vec{BV_2}$ received from multiphase decoder 60. Self-interference term generator 64-1 may provide self-interference term X1 to the input of FIR filter 66-1.

Self-interference term generator 64-2 may generate self-interference term X2 as the second order self-interferer (SI) term of signal of interest soi. Self-interference term generator 64-2 may therefore sometimes be referred to herein as second order SI term generator 64-2 or second order SI term generator circuit 64-2. Self-interference term generator 64-2 may, for example, generate self-interference term X2 (the second order SI term of signal of interest soi) using the equation $X2=n_1 \exp(j2\theta_1)+n_2 \exp(j2\theta_2)$. Self-interference term generator 64-2 may provide self-interference term X2 to the input of FIR filter 66-2.

Self-interference term generator 64-3 may generate self-interference term X3 as the image of the second order SI term of signal of interest soi. Self-interference term generator 64-3 may therefore sometimes be referred to herein as second order SI term image generator 64-3 or second order SI term image generator circuit 64-3. Self-interference term generator 64-3 may, for example, generate self-interference term X3 (the image of the second order SI term of signal of interest soi) using the equation $X3=n_1 \exp(-j2\theta_1)+n_2 \exp(-j2\theta_2)$. Self-interference term generator 64-3 may provide self-interference term X3 to the input of FIR filter 66-3.

Self-interference term generator 64-4 may generate self-interference term X4 as the third order SI term of signal of interest soi. Self-interference term generator 64-3 may therefore sometimes be referred to herein as third order SI term generator 64-4 or third order SI term generator circuit 64-4. Self-interference term generator 64-4 may, for example, generate self-interference term X4 (the third order SI term of signal of interest soi) using the equation $X4=n_1 \exp(j3\theta_1)+n_2 \exp(j3\theta_2)$. Self-interference term generator 64-4 may provide self-interference term X4 to the input of FIR filter 66-4.

Self-interference term generator 64-5 may generate self-interference term X5 as the image of the third order SI term of signal of interest soi. Self-interference term generator 64-5 may therefore sometimes be referred to herein as third order SI term image generator 64-5 or third order SI term image generator circuit 64-5. Self-interference term generator 64-5 may, for example, generate self-interference term X5 (the image of the third order SI term of signal of interest soi) using the equation $X5=n_1 \exp(-j3\theta_1)+n_2 \exp(-j3\theta_2)$. Self-interference term generator 64-5 may provide self-interference term X5 to the input of FIR filter 66-5.

The example of FIG. 2 in which self-interference canceller 32 includes only five self-interference term generators 64 for generating self-interference terms X up to the third order is merely illustrative. Self-interference canceller 32 may compute higher order self-interference terms X if desired. In general, self-interference canceller 32 may generate any desired number of self-interference terms X (e.g., self-interference canceller 32 may include more or fewer than five self-interference term generators 64, FIR filters 66, and multipliers 68).

FIR filters 66 may filter self-interference terms X to produce filtered self-interference terms X' (sometimes referred to herein as filtered terms X'). For example, FIR filter 66-1 may filter self-interference term X1 to generate filtered term X1' (e.g., filtered self-interference term X1'). FIR filter 66-1 may provide filtered term X1' to multiplier 68-1. FIR filter 66-2 may filter self-interference term X2 to generate filtered term X2' (e.g., filtered self-interference term X2'). FIR filter 66-2 may provide filtered term X2' to multiplier 68-2. FIR filter 66-3 may filter self-interference term X3 to generate filtered term X3'. FIR filter 66-3 may provide filtered term X3' to multiplier 68-3. FIR filter 66-4 may filter self-interference term X4 to generate filtered term X4'. FIR filter 66-4 may provide filtered term X4' to multiplier 68-4. FIR filter 66-5 may filter self-interference term X5 to generate filtered term X5'. FIR filter 66-5 may provide filtered term X5' to multiplier 68-5.

FIR filters 66 may generate filtered terms X' in parallel. FIR filters 66 may be, for example, complex FIR filters. If desired, the filter operation performed by FIR filters 66 may vary slightly across self-interference-cancelling terms X1-X5. Collectively, in generating filtered terms X', FIR filters 66 may implement a sinc response of a zero order hold operation on the self-interference terms X received from self-interference term generators 64, as an example.

Multipliers 68 may multiply (scale) filtered terms X' by respective complex coefficients C to produce scaled terms X" (sometimes referred to herein as scaled filtered self-interference terms X"). For example, multiplier 68-1 may multiply (scale) filtered term X1' by a first complex coefficient $C_1$ to generate scaled term X1". Multiplier 68-1 may provide scaled term X1" to the input of adder 70. Multiplier 68-2 may multiply filtered term X2' by a second complex coefficient $C_2$ to generate scaled term X2". Multiplier 68-2 may provide scaled term X2" to the input of adder 70. Multiplier 68-3 may multiply filtered term X3' by a third complex coefficient $C_3$ to generate scaled term X3". Multiplier 68-3 may provide scaled term X3" to the input of adder 70. Multiplier 68-4 may multiply filtered term X4' by a fourth complex coefficient $C_4$ to generate scaled term X4". Multiplier 68-4 may provide scaled term X4" to the input of adder 70. Multiplier 68-5 may multiply filtered term X5' by a fifth complex coefficient $C_5$ to generate scaled term X5". Multiplier 68-5 may provide scaled term X5" to the input of adder 70. Multipliers 68 may generate scaled terms X" in parallel. Complex coefficients $C_1$-$C_5$ may each be different or two or more of the complex coefficients may be the same. Complex coefficients C may, for example, be predetermined complex coefficients that are identified during the design, manufacture, testing, and/or calibration of radio-frequency transmitter 28 (FIG. 1).

Adder 70 may add each of the scaled terms X" received from multipliers 68 to produce self-interference cancelling terms β. Adder 70 may provide self-interference cancelling terms β to a first input of adder 72. Delay circuitry 76 on bypass path 58 may receive signal of interest soi (e.g., in I/Q format) from input path 56. Delay circuitry 76 may add a time delay to signal of interest soi. The time delay may match or compensate for the time consumed by self-interference term generators 64, FIR filters 66, multipliers 68, and/or adder 70 in generating self-interference cancelling terms β. Delay circuitry 76 may output the time-delayed signal of interest soi to a second input of adder 72. Delaying the signal of interest prior to providing the signal of interest to adder 72 may time-synchronize the signal of interest with self-interference cancelling terms β.

Adder 72 may add self-interference cancelling terms β to the time-delayed signal of interest to generate self-interference-compensated signal soi' at output path 74. Adding self-interference cancelling terms β to the signal of interest may cancel out the subsequent effect of repetition replicas of the self-interferers landing on the carrier frequency of the corresponding radio-frequency signal after digital-to-analog conversion by DAC 36 (FIG. 1). This may thereby serve to mitigate EVM degradation and/or spectral regrowth caused by self-interference in the radio-frequency signals output by DAC 36.

Figure 3:
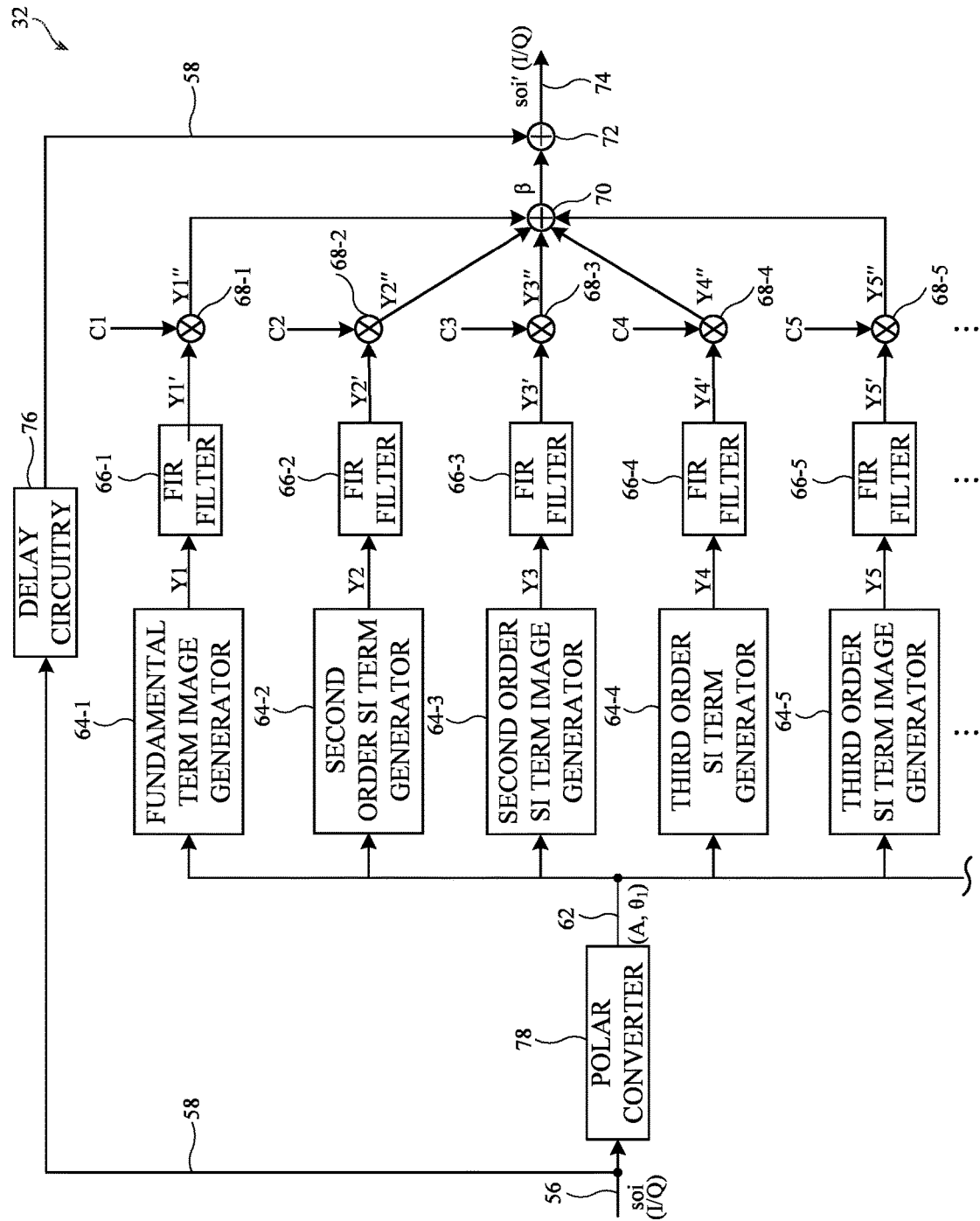
FIG. 3 is a circuit diagram of an illustrative polar self-interference canceller in accordance with some embodiments.

The example of FIG. 2 is merely illustrative and, if desired, other arrangements may be used to implement self-interference canceller 32 (using a multiphase architecture or otherwise). In another suitable arrangement, self-interference canceller 32 may be implemented using a polar architecture. FIG. 3 is a circuit diagram of self-interference canceller 32 in an example where digital transmitter circuitry 30 and thus self-interference canceller 32 are implemented using a polar architecture. In scenarios where self-interference canceller 32 is implemented using a polar architecture, self-interference canceller 32 may sometimes be referred to herein as polar self-interference canceller 32.

As shown in FIG. 3, to operate in polar coordinates, the multiphase decoder 60 of FIG. 2 may be replaced with a polar converter such as polar converter 78. Polar converter 78 may receive signal of interest soi in I/Q format over input path 56. Polar converter 78 may convert the signal of interest from the I/Q format to a polar format. In the polar format, each sample point of signal of interest soi is represented by an amplitude A and a phase θ. Polar converter 78 may include, for example, coordinate rotation digital computer (CORDIC) circuitry that performs the conversion using a CORDIC algorithm. Polar converter 78 may therefore sometimes referred to herein as polar conversion circuitry 78, polar converter circuitry 78, I/Q-to-polar converter 78, I/Q-to-polar converter circuitry 78, or CORDIC circuitry 78. Polar converter 78 may provide amplitude A and phase θ to each of the self-interference term generators 64 over path 62.

Each self-interference term generator 64 may individually (independently) generate a respective self-interference term Y based on the amplitude A and phase θ received from polar converter 78 (e.g., self-interference term generator 64-1 may generate self-interference term Y1, self-interference term generator 64-2 may generate self-interference term Y2, self-interference term generator 64-3 may generate self-interference term Y3, etc.). Self-interference terms Y may be provided to FIR filters 66. Self-interference term generators 64 may generate each of the self-interference terms Y in parallel.

The operations of FIR filters 66, multipliers 68, adder 70, adder 72, and delay circuitry 76 may be the same as described above in connection with the multiphase architecture of FIG. 2. However, self-interference term generators 64 may use different formulas for generating self-interference terms Y (in polar coordinates) than those that are used in generating self-interference terms X under the multiphase architecture of FIG. 2. For example, self-interference term generator 64-1 may generate self-interference term Y1 (e.g., the image of the fundamental term of signal of interest soi) using the equation $Y1=A \exp(-j\theta)$, self-interference term generator 64-2 may generate self-interference term Y2 (e.g., the second order SI term of signal of interest soi) using the equation $Y2=A \exp(j2\theta)$, self-interference term generator 64-3 may generate self-interference term Y3 (e.g., the image of the second order SI term of signal of interest soi) using the equation $Y3=A \exp(-j2\theta)$, self-interference term generator 64-4 may generate self-interference term Y4 (e.g., the third order SI term of signal of interest soi) using the equation $Y4=A \exp(j3\theta)$, and self-interference term generator 64-5 may generate self-interference term Y5 (e.g., the image of the third order SI term of signal of interest soi) using the equation $Y5=A \exp(-j3\theta)$. Higher order self-interference terms may also be generated for producing self-interference-compensated signal soi' if desired. The example of FIG. 3 is merely illustrative and, if desired, other arrangements may be used to implement self-interference canceller 32 (using a polar architecture or otherwise).

Figure 4:
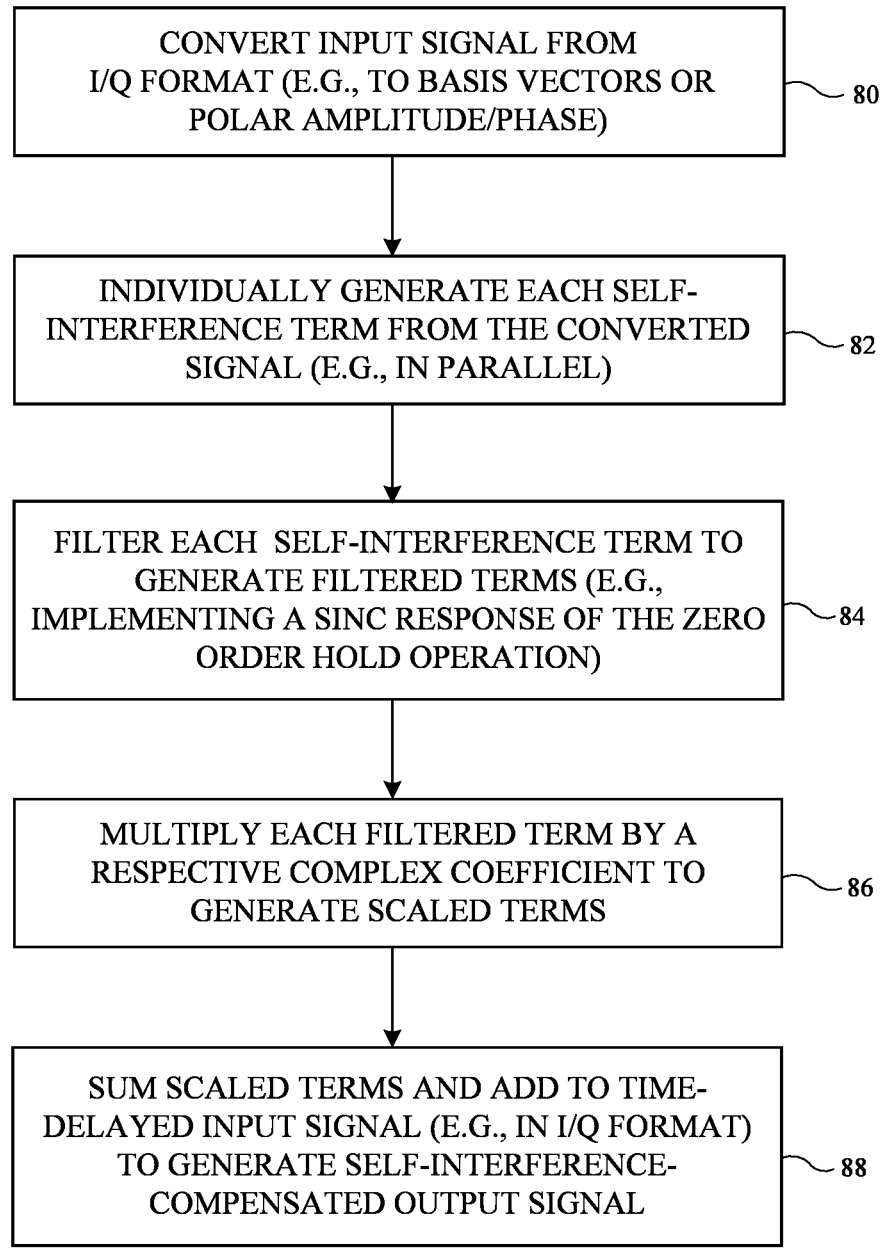
FIG. 4 is a flow chart of illustrative steps involved in generating self-interference-compensated signals using a self-interference canceller in accordance with some embodiments.

FIG. 4 is a flow chart of illustrative steps that may be performed by self-interference canceller 32 in producing self-interference-compensated signal soi'. The steps of FIG. 4 may, for example, be performed once signal of interest soi is received by self-interference canceller 32 over input path 56 (FIGS. 2 and 3).

At step 80, self-interference canceller 32 may convert signal of interest soi from an I/Q format into signal terms of a different signal format (e.g., into multiphase basis vectors or a polar phase and amplitude). In scenarios where self-interference canceller 32 includes multiphase decoder 60 (FIG. 2), multiphase decoder 60 may convert signal of interest soi to first basis vector $\overrightarrow{BV_1}$ and second basis vector $\overrightarrow{BV_2}$. In scenarios where self-interference canceller 32 includes polar converter 78 (FIG. 3), polar converter 78 may convert signal of interest soi to a corresponding amplitude A and phase θ (e.g., the basis vectors or the polar amplitude and phase may form the signal terms of the different format).

At step 82, self-interference term generators 64 may each individually generate a respective self-interference term based on the signal terms of the different format generated while processing step 80. For example, self-interference term generators 64 may each individually generate a respective self-interference term based on the first and second basis vectors (e.g., as self-interference terms X of FIG. 2) or based on amplitude A and phase θ (e.g., as self-interference terms Y of FIG. 3). The self-interference term generators 64 in self-interference canceller 32 may generate the self-interference terms in parallel.

At step 84, FIR filters 66 may filter the self-interference terms to generate corresponding filtered terms (e.g., filtered terms X' of FIG. 2 or filtered terms Y' of FIG. 3). In generating the filtered terms, FIR filters 66 may, for example, implement a sinc response of a zero order hold operation.

At step 86, multipliers 68 may multiply (scale) the filtered terms by respective complex coefficient values C to generate corresponding scaled terms (e.g., scaled terms X" of FIG. 2 or scaled terms Y" of FIG. 3).

At step 88, adder 70 may sum the scaled terms to generate self-interference cancelling terms β. Adder 72 may sum self-interference cancelling terms β with a time-delayed version of signal of interest soi to generate self-interference-compensated signal soi' (e.g., delay circuitry 76 may delay signal of interest soi to produce the time-delayed version of the signal of interest prior to, after, between, and/or concurrently with any of the steps of FIG. 4). Self-interference-compensated signal soi' may subsequently be passed to other components in digital transmitter circuitry 30 (FIG. 1) and may be received at the set of signal inputs of DAC 36 over signal path 46 (e.g., as digital signals sig' of FIG. 1). The steps of FIG. 4 may be repeated for each sample point of signal of interest soi. Upon digital-to-analog conversion and up-conversion to radio-frequencies (e.g., as radio-frequency signals sigrf of FIG. 1), the self-interference-compensated signal may introduce no or negligible self-interferer repetition replicas that land on the carrier frequency of the radio-frequency signals. This may allow radio-frequency signals sigrf to be free from EVM degradation and/or spectral regrowth that would otherwise have been produced due to self-interference in the radio-frequency signals output by DAC 36.

Figure 5:
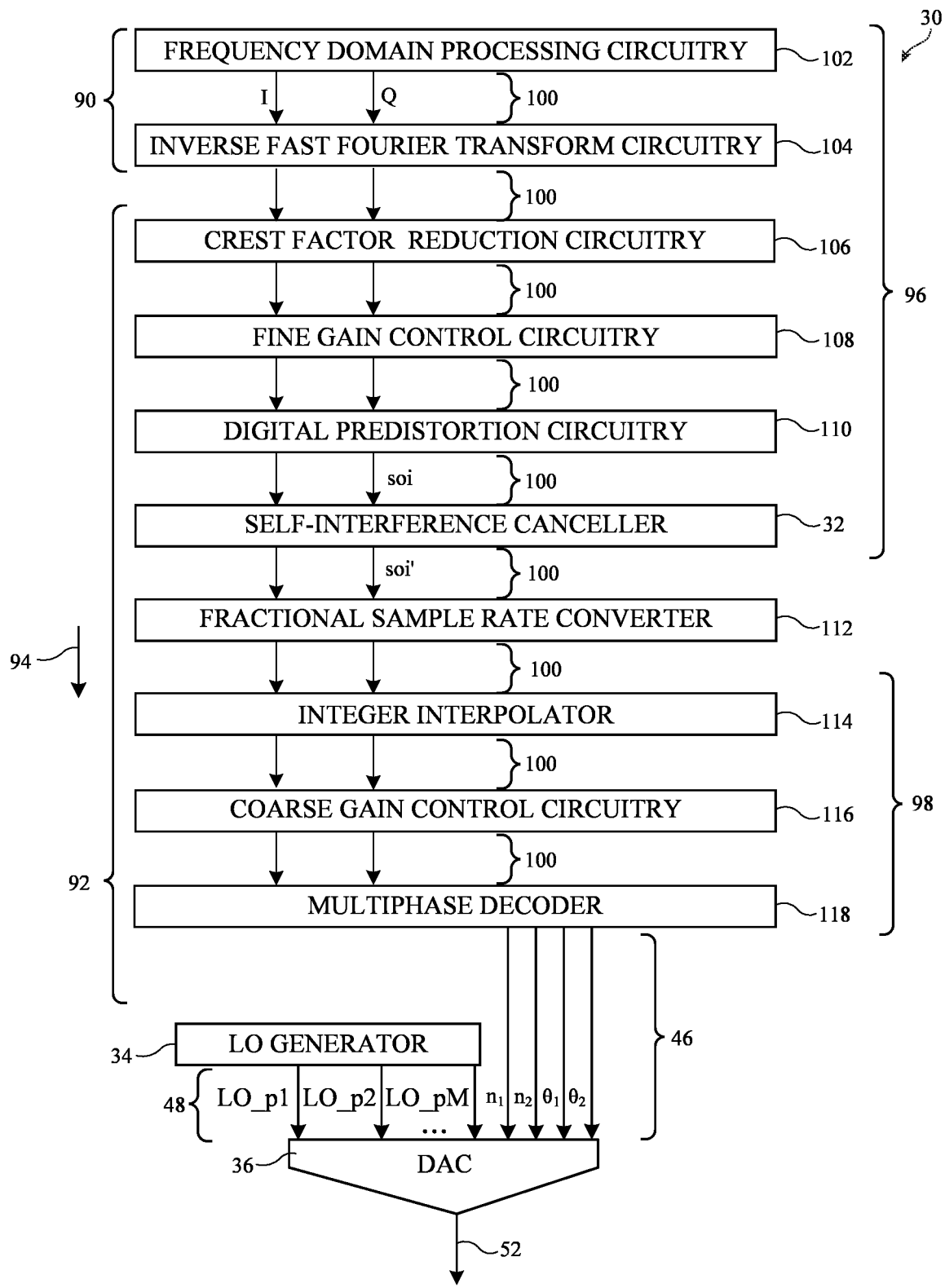
FIG. 5 is a circuit diagram showing how an illustrative self-interference canceller may be located in a low sample rate portion of a digital transmitter in accordance with some embodiments.

Self-interference canceller 32 may be placed at any desired location along the transmit chain of digital transmitter circuitry 30 (FIG. 1). As examples, self-interference canceller 32 may be located in a portion of digital transmitter circuitry 30 that operates at a relatively low sample rate or in a portion of digital transmitter circuitry 30 that operates at a relatively high sample rate. FIG. 5 is a diagram showing an example of how self-interference canceller 32 may be located in a portion of digital transmitter circuitry 30 that operates at a relatively low sample rate. In the example of FIG. 5, digital transmitter circuitry 30 is implemented using a multi-phase architecture. This is merely illustrative and, in general, the components of digital transmitter circuitry 30 may be adapted to implement other architectures (e.g., a polar architecture, etc.).

As shown in FIG. 5, digital transmitter circuitry 30 may include a transmit chain of digital components that are interposed along signal path 100 from frequency domain processing circuitry 102 to the set of signal inputs of DAC 36. The signals to be transmitted (e.g., using antenna 42(s) of FIG. 1) may be conveyed along signal path 100. The signals conveyed over signal path 100 may be I/Q signals (e.g., signal path 100 may include a first line for conveying the in-phase (I) component of the signals and a second line for conveying the quadrature-phase (Q) component of the signals). Frequency domain processing circuitry 102 may, for example, receive baseband signals sig from baseband processor 26 (FIG. 1) or from elsewhere in radio-frequency transmitter 28.

The transmit chain of digital transmitter circuitry 30 may include digital components that operate in the frequency domain such as frequency domain circuitry 90 and digital components that operate in the time domain such as time domain circuitry 92. Time domain circuitry 92 may be interposed along signal path 100 between frequency domain circuitry 90 and DAC 36. Frequency domain circuitry 90 may include frequency domain processing circuitry 102 and inverse fast Fourier transform circuitry 104 coupled to the output of frequency domain processing circuitry 102.

Time domain circuitry 92 may include crest factor reduction circuitry such as crest factor reduction (CFR) circuitry 106, fine gain control circuitry such as fine gain control circuitry 108 (sometimes referred to herein as fine gain controller 108), digital predistortion (DPD) circuitry 110 (sometimes referred to herein as digital pre-distorter 110), self-interference canceller 32, a sample rate converter such as fractional sample rate converter 112 (sometimes referred to herein as sample rate conversion circuitry 112 or fractional sample rate conversion circuitry 112), an integer interpolator such as integer interpolator 114 (sometimes referred to herein as integer interpolation circuitry 114), coarse gain control circuitry such as coarse gain control circuitry 116 (sometimes referred to herein as coarse gain controller 116), and a multiphase decoder such as multiphase decoder 118.

The input of CFR circuitry 106 may be coupled to the output of frequency domain circuitry 90. The input of fine gain control circuitry 108 may be coupled to the output of CFR circuitry 106 (e.g., CFR circuitry 106 may be interposed on signal path 100 between frequency domain circuitry 90 and fine gain control circuitry 108). The input of DPD circuitry 110 may be coupled to the output of fine gain control circuitry 108 (e.g., fine gain control circuitry 108 may be interposed on signal path 100 between CFR circuitry 106 and DPD circuitry 110). The input of self-interference canceller 32 (e.g., input path 56 of FIG. 2) may be coupled to the output of DPD circuitry 110 (e.g., DPD circuitry 110 may be interposed on signal path 100 between fine gain control circuitry 108 and self-interference canceller 32). The input of fractional sample rate converter 112 may be coupled to the output of self-interference canceller 32 (e.g., self-interference canceller 32 may be interposed on signal path 100 between DPD circuitry 110 and fractional sample rate converter 112). The input of integer interpolator 114 may be coupled to the output of fractional sample rate converter 112 (e.g., fractional sample rate converter 112 may be interposed on signal path 100 between self-interference canceller 32 and integer interpolator 114). The input of coarse gain control circuitry 116 may be coupled to the output of integer interpolator 114 (e.g., integer interpolator 114 may be interposed on signal path 100 between fractional sample rate converter 112 and coarse gain control circuitry 116). The input of multiphase decoder 118 may be coupled to the output of coarse gain control circuitry 116 (e.g., coarse gain control circuitry 116 may be interposed on signal path 100 between integer interpolator 114 and multiphase decoder 118). The output of multiphase decoder 118 may be coupled to the set of signal inputs of DAC 36 over signal path 46. The output of LO generator 34 may be coupled to the set of LO inputs of DAC 36 over LO path 48.

The example of FIG. 5 is merely illustrative. If desired, one or more of these components along the transmit chain of digital transmitter circuitry 30 may be omitted. Other digital transmitter components may be interposed along signal path 100 if desired. The components may be arranged on signal path 100 in other orders if desired.

Frequency domain processing circuitry 102 may perform frequency domain processing on the baseband signals received from baseband processor 26 (e.g., baseband signals sig of FIG. 1). Inverse fast Fourier transform circuitry 104 may perform an inverse fast Fourier transform (IFFT) operation on the signals to convert the signals from the frequency domain to the time domain. CFR circuitry 106 may perform crest factor reduction operations on the signals (e.g., in the time domain). Fine gain control circuitry 108 may include multipliers or other components that finely adjust the magnitude of the signals. DPD circuitry 110 may perform digital predistortion operations on the signals. Self-interference canceller 32 may perform self-interference cancellation operations (e.g., using the steps of FIG. 4) on the signals (as signal of interest soi) to produce self-interference-compensated signal soi'.

Fractional sample rate converter 112 may increase the sample rate of self-interference-compensated signal soi'. In general, the sample rate of the components in digital transmitter circuitry 30 may increase in the direction of arrow 94. The portion 96 of digital transmitter circuitry 30 prior to fractional sample rate converter 112 may operate at sample rates that are below a threshold sample rate whereas the portion 98 of digital transmitter circuitry 30 after fractional sample rate converter 112 operates at sample rates that are greater than the threshold sample rate. Portion 96 of digital transmitter circuitry 30 may therefore sometimes be referred to herein as low sample rate portion 96 or low sample rate circuitry 96 of digital transmitter circuitry 30. Portion 98 of digital transmitter circuitry 30 may sometimes be referred to herein as high sample rate portion 98 or high sample rate circuitry 98 of digital transmitter circuitry 30.

Integer interpolator 114 may perform integer interpolation on the (up-sampled) self-interference-compensated signal soi'. Coarse gain control circuitry 116 may include multipliers, bit-shifters, or other components that coarsely adjust the magnitude of self-interference-compensated signal soi' (e.g., with coarser adjustments than are performed by fine gain control circuitry 108). Multiphase decoder 118 may convert self-interference-compensated signal from the I/Q format to a multiphase format (e.g., as basis vectors $\overrightarrow{BV_1} = (n_1, \theta_1)$ and $\overrightarrow{BV_2} = (n_2, \theta_2)$. Basis vectors $\overrightarrow{BV_1}$ and $\overrightarrow{BV_2}$ may be provided to the set of signal inputs of DAC 36 over signal path 46 (e.g., as self-interference-compensated signals sig' of FIG. 1).

LO generator 34 may produce square-wave LO waveforms (e.g., square-wave LO waveforms 50 of FIG. 1) with M-number phases from LO_p1 to LO_pM, where the phase difference between adjacent LO waveforms is 360°/M. LO generator 34 may provide these M-phases of LO waveforms to the set of LO inputs of DAC 36 over LO path 48. DAC 36 may produce analog (continuous) radio-frequency signals sigrf (FIG. 1) at output path 52 based on the self-interference-compensated signals received from multiphase decoder 118 and the square-wave LO waveforms 50 received from digital transmitter circuitry 30.

Figure 6:
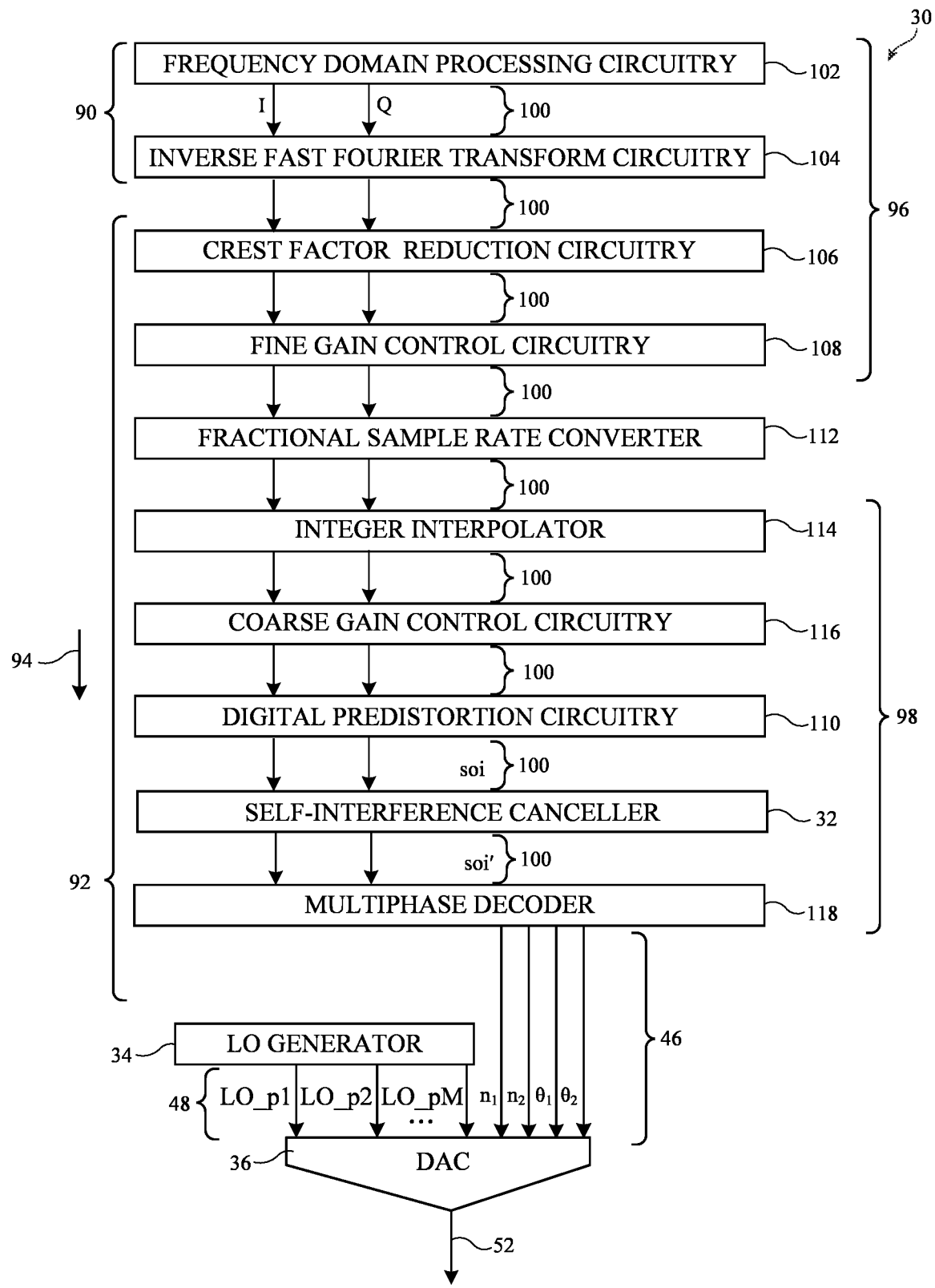
FIG. 6 is a circuit diagram showing how an illustrative self-interference canceller may be located in a high sample rate portion of a digital transmitter in accordance with some embodiments.

In the example of FIG. 5, self-interference canceller 32 is located in low sample rate portion 96 of digital transmitter circuitry 30 (e.g., fractional sample rate converter 112 is interposed on signal path 100 between self-interference canceller 32 and multiphase decoder 118). This is merely illustrative. In another suitable arrangement, self-interference canceller 32 may be located in high sample rate portion 98 of digital transmitter circuitry 30 (e.g., after sample rate conversion by fractional sample rate converter 112). FIG. 6 is a diagram showing how self-interference canceller 32 may be located in high sample rate portion 98 of digital transmitter circuitry 30.

As shown in FIG. 6, fractional sample rate converter 112 may be located earlier in the transmit chain of digital transmitter circuitry 30 than self-interference canceller 32. In the example of FIG. 6, the input of fractional sample rate converter 112 is coupled to the output of fine gain control circuitry 108 (e.g., low sample rate portion 96 of digital transmitter circuitry 30 may include frequency domain processing circuitry 102, inverse fast Fourier transform circuitry 104, CFR circuitry 106, and fine gain control circuitry 108, whereas high sample rate portion 98 of digital transmitter circuitry 30 includes integer interpolator 114, coarse gain control circuitry 116, DPD circuitry 110, self-interference canceller 32, and multiphase decoder 118). In addition, in this example, the input of DPD circuitry 110 is coupled to the output of coarse gain control circuitry 116 and the output of self-interference canceller 32 is coupled to the input of multiphase decoder 118 (e.g., self-interference canceller 32 may be interposed on signal path 100 between fractional sample rate converter 112 and multiphase decoder 118). This example is merely illustrative and, in general, the components in digital transmitter circuitry 30 may be arranged in any desired order. Other architectures may be used to integrate self-interference canceller 32 within digital transmitter circuitry 30 if desired.

Figure 7:
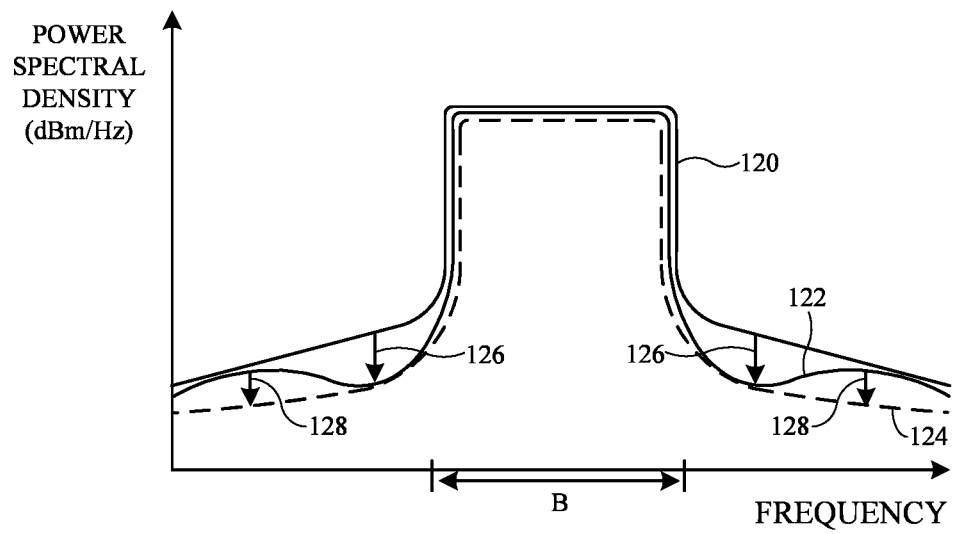
FIG. 7 is a plot showing how an illustrative self-interference canceller may optimize digital transmitter performance (power spectral density) as a function of frequency in accordance with some embodiments.

FIG. 7 is a plot showing how self-interference canceller 32 may optimize power spectral density for radio-frequency transmitter 28. As shown in FIG. 7, curve 120 plots the power spectral density (PSD) of radio-frequency signals transmitted by radio-frequency transmitter 28 (e.g., radio-frequency signals sigrf of FIG. 1) as a function of frequency (e.g., where the radio-frequency signals are transmitted at a corresponding carrier frequency and with bandwidth B), in a scenario where self-interference canceller 32 is omitted. As shown by curve 120, the radio-frequency signals may exhibit peak PSD across bandwidth B but may exhibit relatively high density tails (spectral regrowth) above and below bandwidth B.

Curve 122 plots the PSD of the radio-frequency signals when self-interference canceller 32 is formed within low sample rate portion 96 of digital transmitter circuitry 30 (FIG. 5). As shown by curve 122, self-interference canceller 32 in low sample rate portion 96 may cause the radio-frequency signals to exhibit a PSD that is less than the PSD associated with curve 120 immediately above and below bandwidth B, as shown by arrows 126 (e.g., by as much as 10 dB or greater).

Dashed curve 124 plots the PSD of the radio-frequency signals when self-interference canceller 32 is formed within high sample rate portion 98 of digital transmitter circuitry 30 (FIG. 6). As shown by dashed curve 124, self-interference canceller 32 in high sample rate portion 98 may cause the radio-frequency signals to exhibit a PSD that is less than the PSD associated with curve 122 at frequencies that are even farther above and below bandwidth B, as shown by arrows 128 (e.g., by as much as 6-9 dB or greater). These improvements in spectral emission, as shown by arrows 126 and 128, may be produced by the operation of self-interference canceller 32 in mitigating repetition replicas of self-interferers of the signal of interest from landing on the carrier frequency, for example. The example of FIG. 7 is merely illustrative. Curves 120, 122, and 124 may have other shapes in practice.

Figure 8:
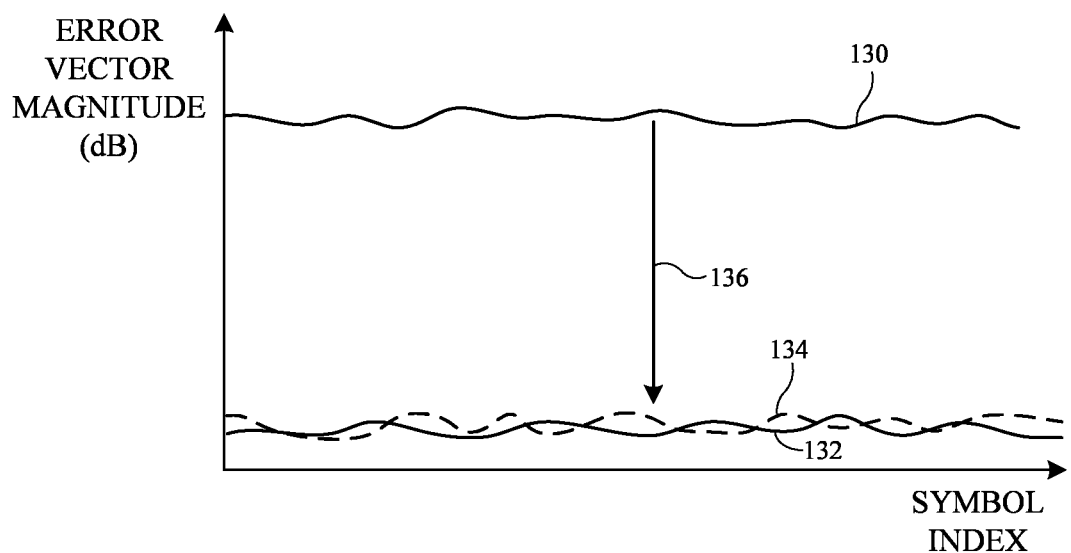
FIG. 8 is a plot showing how an illustrative self-interference canceller may optimize digital transmitter performance (error vector magnitude) as a function of symbol index in accordance with some embodiments.

FIG. 8 is a plot showing how self-interference canceller 32 may optimize EVM performance for radio-frequency transmitter 28. As shown in FIG. 8, curve 130 plots the EVM of radio-frequency signals transmitted by radio-frequency transmitter 28 (e.g., radio-frequency signals sigrf of FIG. 1) as a function of symbol index in a scenario where self-interference canceller 32 is omitted. As shown by curve 130, the radio-frequency signals may exhibit a relatively high EVM.

Curve 132 plots the EVM of the radio-frequency signals when self-interference canceller 32 is formed within low sample rate portion 96 of digital transmitter circuitry 30 (FIG. 5). Dashed curve 134 plots the PSD of the radio-frequency signals when self-interference canceller 32 is formed within high sample rate portion 98 of digital transmitter circuitry 30 (FIG. 6). As shown by curves 132 and 134, self-interference canceller 32 may cause the radio-frequency signals to exhibit an EVM that is less than the EVM associated with curve 130, as shown by arrow 136 (e.g., by as much as 14 dB or greater). The example of FIG. 8 is merely illustrative. Curves 130, 132, and 134 may have other shapes in practice.

The methods and operations described above in connection with FIGS. 1-8 may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., storage circuitry 16 and/or digital transmitter circuitry 30 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., processing circuitry in digital transmitter circuitry 30, processing circuitry 18 of FIG. 1, etc.). The processing circuitry may include microprocessors, central processing units (CPUs), application-specific integrated circuits with processing circuitry, or other processing circuitry.

The foregoing is merely illustrative and various modifications can be made to the described embodiments. The foregoing embodiments may be implemented individually or in any combination.

What is claimed is:

1. A wireless transmitter comprising:
   an input path configured to receive a signal of interest corresponding to a baseband signal;
   self-interference term generators coupled to the input path in parallel and configured to generate self-interference terms based on the signal of interest;
   an adder configured to generate a self-interference-compensated signal based at least in part on the self-interference terms;
   a bypass path that couples the input path to the adder; and
   delay circuitry disposed on the bypass path.

2. The wireless transmitter of claim 1 further comprising:
   a digital-to-analog converter (DAC) having a signal input configured to receive the self-interference-compensated signal and configured to generate a radio-frequency signal based on the self-interference-compensated signal.

3. The wireless transmitter of claim 1, wherein the self-interference term generators comprise:
   a fundamental self-interference term image generator; and
   a second order self-interference term generator.

4. The wireless transmitter of claim 3, wherein the self-interference term generators further comprise:
   a second order self-interference term image generator.

5. The wireless transmitter of claim 4, wherein the self-interference term generators further comprise:
   a third order self-interference term generator.

6. The wireless transmitter of claim 5, wherein the self-interference term generators further comprise:
   a third order self-interference term image generator.

7. A wireless transmitter comprising:
   an input path configured to receive a signal of interest corresponding to a baseband signal;
   self-interference term generators coupled to the input path in parallel and configured to generate self-interference terms based on the signal of interest;
   an adder configured to generate a self-interference-compensated signal based at least in part on the self-interference terms; and
   filters coupled in series with the self-interference term generators between the self-interference term generators and the adder.

8. The wireless transmitter of claim 7, wherein the filters comprise finite impulse response (FIR) filters.

9. The wireless transmitter of claim 7, wherein the filters are configured to generate filtered terms based on the self-interference terms, the wireless transmitter further comprising:
   multipliers coupled in series with the filters between the filters and the adder, wherein the multipliers are configured to generate scaled terms by multiplying the filtered terms by one or more complex coefficient values.

10. The wireless transmitter of claim 9, further comprising:
    an additional adder coupled between the multipliers and the adder, wherein the additional adder is configured to generate a summed value by adding the scaled terms together.

11. A wireless transmitter comprising:
    an input path configured to receive a signal of interest corresponding to a baseband signal;
    self-interference term generators coupled to the input path in parallel and configured to generate self-interference terms based on the signal of interest;
    an adder configured to generate a self-interference-compensated signal based at least in part on the self-interference terms;
    a set of multipliers, wherein each multiplier in the set of multipliers is coupled in series between a respective one of the self-interference term generators and the adder.

12. A wireless transmitter comprising:
    an input path configured to receive a baseband signal;
    an output path configured to output a self-interference-compensated signal;
    a first portion coupled to the input path and configured to operate at first sample rates;
    a second portion coupled to the output path and configured to operate at second sample rates;
    a sample rate converter coupled between the first and second portions; and
    a self-interference canceller in the first portion of the wireless transmitter and configured to generate the self-interference-compensated signal based at least in part on the baseband signal.

13. The wireless transmitter of claim 12, wherein the second sample rates are greater than the first sample rates.

14. The wireless transmitter of claim 13, further comprising:
    a digital-to-analog converter (DAC) coupled to the output path and being configured to generate a radio-frequency signal based on the self-interference-compensated signal.

15. The wireless transmitter of claim 12, further comprising:
    a digital-to-analog converter (DAC) coupled to the output path and being configured to generate a radio-frequency signal based on the self-interference-compensated signal.

16. A wireless transmitter comprising:
    an input path configured to receive a baseband signal;
    an output path configured to output a self-interference-compensated signal;
    a first portion coupled to the input path and configured to operate at first sample rates;
    a second portion coupled to the output path and configured to operate at second sample rates;
    a sample rate converter coupled between the first and second portions; and
    a self-interference canceller in the second portion of the wireless transmitter and configured to generate the self-interference-compensated signal based at least in part on the baseband signal.

17. The wireless transmitter of claim 16, wherein the second sample rates are greater than the first sample rates.

18. The wireless transmitter of claim 17, further comprising:
    a digital-to-analog converter (DAC) coupled to the output path and being configured to generate a radio-frequency signal based on the self-interference-compensated signal.

* * * * *